(12) United States Patent
Varshney et al.

(10) Patent No.: US 9,533,882 B1
(45) Date of Patent: Jan. 3, 2017

(54) DIAMOND-LIKE CARBON NANORODS AND FABRICATION THEREOF

(75) Inventors: Deepak Varshney, San Juan, PR (US); Vladimir Makarov, San Juan, PR (US); Gerardo Morell, Guaynabo, PR (US); Puja Saxena, San Juan, PR (US); Brad Weiner, Dorado, PR (US)

(73) Assignee: University of Puerto Rico, San Juan, PR (US)

(*) Notice: Subject to any disclaimer, the term of this patent is extended or adjusted under 35 U.S.C. 154(b) by 558 days.

(21) Appl. No.: 13/070,678

(22) Filed: Mar. 24, 2011

Related U.S. Application Data

(60) Provisional application No. 61/316,905, filed on Mar. 24, 2010.

(51) Int. Cl.
| | | |
|---|---|---|
| *B01J 20/28* | (2006.01) | |
| *B82Y 30/00* | (2011.01) | |
| *C01B 31/02* | (2006.01) | |
| *D01F 9/127* | (2006.01) | |

(52) U.S. Cl.
CPC .......... *B82Y 30/00* (2013.01); *B01J 20/28028* (2013.01); *C01B 31/02* (2013.01); *D01F 9/127* (2013.01); *B01J 2203/0655* (2013.01)

(58) Field of Classification Search
None
See application file for complete search history.

(56) References Cited

U.S. PATENT DOCUMENTS

| | | | | |
|---|---|---|---|---|
| 6,156,256 A | * | 12/2000 | Kennel | 264/461 |
| 2003/0015414 A1 | * | 1/2003 | Kajiura | B01J 19/088 |
| | | | | 204/157.15 |
| 2008/0107587 A1 | * | 5/2008 | Yumura | B82Y 30/00 |
| | | | | 423/447.3 |
| 2010/0084634 A1 | * | 4/2010 | Gamo | C23C 16/27 |
| | | | | 257/40 |

OTHER PUBLICATIONS

Pribat et al.; Uniformed Patterned Growth of Carbon Nanotubes with Surface Carbon; Applied Physics Letters; vol. 79, No. 10; Sep. 3, 2001.*
Definition coating Merriam Webster; No. 2015.*

* cited by examiner

*Primary Examiner* — Guinever S Gregorio
(74) *Attorney, Agent, or Firm* — Hoglund & Pamias, PSC; Robert J. Rios

(57) ABSTRACT

Novel $sp^3$ rich diamond-like carbon (DLC) nanorod films were fabricated by hot filament chemical vapor deposition technique. The results are indicative of a bottom-up self-assembly synthesis process, which results in a hierarchical structure that consists of microscale papillae comprising numerous nanorods. The papillae have diameters ranging from 2 to 4 μm and the nanorods have diameters in the 35-45 nm range. A growth mechanism based on the vapor liquid-solid mechanism is proposed that accounts for the morphological aspects in the micro- and nano-scales.

26 Claims, 6 Drawing Sheets

(a)

(b)

(c)

(d)

DIAMOND-LIKE CARBON NANORODS AND FABRICATION THEREOF

GOVERNMENT INTEREST

The claimed invention was made with U.S. Government support under grant number NNX07AO30A awarded by the National Aeronautics and Space Administration (NASA). The government has certain rights in this invention.

BACKGROUND OF THE INVENTION

DLC can be defined as the metastable phase of a-C and a-CH containing graphitic $sp^2$ clusters embedded in an amorphous $sp^3$ bonded matrix. DLC material comprises a nanocrystalline diamond matrix with graphitic inclusions where collective behavior of $sp^2$ states is responsible for optical and electrical properties and the $sp^3$ states govern the mechanical properties. It is a promising candidate for a wide range of applications such as in magnetic storage discs, automobile parts, microelectronic devices, electronics, and biomedical field. But the active device application of the DLC films reported till date is marred by factors viz. high electrical resistivity, large intrinsic stress tending to degrade the electrical and optical properties and poor adhesion leading to "peel off" from the substrate. The fabrication of DLC nanostructures with improved electrical conductivity as well as high strength is an impending need.

SUMMARY OF THE INVENTION

The present invention provides a synthesis method of a highly crystalline DLC nanorod film with high $sp^3$ content.

According to an aspect of the invention, a nanorod film comprises a plurality of spherical papillae 0.2-0.4 µm in diameter, and each papilla has radially emanating nanorods with a diameter of 35-45 nm.

Development of synthesis of new DLC nano-structured materials finds applications in new generation aerospace, electronics, medical implants and instrumentation. This nano-structured material also finds application in selective chemical sensors. The DLC thin film energy spectrum as well as state density in such spectrum is strongly changed by absorption of water and alcohol vapors by the DLC thin film surface. The discussed effect was studied by charge-based deep level transient spectroscopy, and it was shown that spectrum of interest is dramatically changed in the presence of traces amount of $H_2$ and alcohol chemical compounds.

According to another aspect of the invention, synthesis methods of new DLC materials for sensing purposes according to different chemical compounds are provided. The DLC nanorod as well can be considered as potential source materials to develop the spintronics devices. Such nanostructured materials doped by transition metal ions can have very interesting magnetic properties, which can be related to Spintronics phenomenon The present invention to the best of our knowledge provides the first ever synthesis of DLC nanorods synthesized on Si substrate by Chemical vapor deposition (CVD).

According to an aspect of the invention, synthesis of a new morphology of DLC in the form of rods that will add impetus to the existing applications of DLC and lead to significant advancement in quality and quantity of material science research and at the same time open new areas for various other potential applications in the field of nanoelectronics is provided.

According to another aspect of the invention, a process for fabrication of DLC nanorods includes the steps of exposing a catalyst coated substrate to a mixture of at least a carbon containing gas, hydrogen and a sulfur containing species at a substrate temperature of 750-1000° C. for a period of about 30-90 min in presence of an energy source that can break the gaseous molecules into radicals.

According to still another aspect of the present invention, a process of fabrication of DLC nanorods is provided, wherein the carbon containing gas is methane, acetylene or alcohol vapor.

According to yet another aspect of the present invention, the alcohol is selected from C1-C6 alcohol.

According to a further aspect of the invention, the substrate material includes but is not limited to Si, quartz, alumina, and copper.

According to an aspect of the invention, a catalyst-assisted fabrication of DLC nanorods is provided, wherein the catalyst can be coated on the substrate by techniques including but not limited to chemical vapor deposition, physical vapor deposition, ion-beam deposition, sputtering, e-beam evaporation, vacuum deposition, spin coating, and dipping.

According to another aspect of the invention, iron is used as catalyst. Any source of iron or an iron compound can be used depending upon the method utilized for coating the catalyst on the substrate.

According to still another aspect of the invention, a process of fabrication of DLC nanorods is provided wherein the catalyst layer is less than 100 nm thick.

According to yet another aspect of the invention, the ratio of the carbon-containing gas and hydrogen is 0.1-3.0:100.

According to one aspect of the invention, the sulphur-containing species includes but is not limited to hydrogen sulfide or carbon disulphide.

According to another aspect of the invention, the concentration of sulphur-containing species is in the range of about 100-1000 ppm.

According to still another aspect of the invention, a process of fabrication of DLC nanorods is provided that includes the steps of exposing a catalyst coated substrate to a mixture of at least a carbon-containing gas, hydrogen and a sulfur-containing species at a substrate temperature of 750-1000° C. for a period of about 30-90 min in presence of an energy source that can break the gaseous molecules into radicals, wherein the total pressure of the gases is in the range of about 10-100 Torr.

According to an aspect of the invention, nanorods of diamond-like carbon with high $sp^3$ content and a high surface to volume ratio are provided.

According to another aspect of the invention, DLC nanorods are fabricated by a process that includes the steps of exposing a catalyst coated substrate to a mixture of at least a carbon containing gas, hydrogen and sulfur-containing species at a substrate temperature of 750-1000° C. for a period of about 30-90 min in presence of an energy source that can break the gaseous molecules into radicals.

According to yet another aspect of the invention, DLC nanorods are grown by using the vapor-liquid-solid mechanism. In this mechanism, when the substrate temperature rises, the catalyst on its surface transforms into nanosized droplets and the active chemical species or radicals produced from the input gases interact with the catalyst surface, producing substitution diffusion of carbon in catalyst layer. The incoming carbon vapors from the filament diffuse and condense at the solid/liquid interface, and the rate of this process is dependent on the concentration of the active chemical species, which are in the gas phase and are dependent on temperature. As the catalyst droplets continuously absorb the vapors, they are supersaturated with carbon, resulting in extrusion of excess carbon in the form of a rod.

According to one aspect of the invention, the energy source used to break the gaseous molecules into radicals includes but is not limited to hot filament, microwave plasma, radio frequency, UV light, and laser radiation.

According to another aspect of the invention, a diamond-like carbon nanorod has a longer axis in the range of about 5-500 nm and a shorter axis in the range of about 0.5 to 50 nm.

According to yet another aspect of the invention, a diamond-like carbon nanorod that may or may not have an aggregation of catalyst particles at the tip is provided.

According to still another aspect of the invention, a device is provided comprising at least one single nanorod of diamond-like carbon, selected from sensors, devices used in micro- or nano- or optoelecronics, SEM tips, cold cathode devices, or field emission devices.

According to one aspect of the invention, a process of fabricating diamond-like carbon nanorods includes the steps of: forming a patterned nanotemplate of catalyst material on the substrate; and exposing the catalyst coated substrate to a mixture of at least a carbon-containing gas, hydrogen and sulfur-containing species at a substrate temperature of about 750-1000° C. in presence of an energy source that can break the gaseous molecules into radicals for a period of about 30-90 min.

According to a further aspect of the invention, the nanotemplate formation can be carried out using a variety of techniques including but not limited to lithography, ion-beam patterning, nanostencils, photolithography, inkjet printing, and guided and unguided self assembly.

According to still another aspect of the invention, the carbon-containing gas is methane, acetylene or alcohol vapor; the alcohol is selected from C1-C6 alcohol; and the substrate material includes but is not limited to Si, quartz, alumina, and copper.

According to yet another aspect of the invention, in a catalyst assisted fabrication of DLC nanorods, the catalyst can be coated on the substrate by various techniques including but not limited to chemical vapor deposition, physical vapor deposition, ion-beam deposition, sputtering, e-beam evaporation, vacuum deposition, spin coating, and dipping.

According to another aspect of the invention, iron is used as catalyst and any source of iron including but not limited to ferrocene can be used depending upon the method utilized for coating the catalyst on the substrate.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

The present invention will be explained in more detail with reference to the following example. However, the example is given for the purpose of illustration of one of the various embodiments of the present invention and in no way be construed as limiting the scope of the invention.

I Experimental Procedure

A self-assembly of iron nanostructures was fabricated on an n-type (100) Si substrate using spin coated polystyrene spheres. A major problem encountered in the monolayer coverage of polystyrene spheres was the lack of areal uniformity throughout the wafer surface which in turn was due to non adhesion of polystyrene spheres on the substrate surface. Thus, prior to spin coating the Si substrates were ultrasonicated in 20 mL of HF (47-51%) for 20 min and subsequently boiled in 20 mL $HNO_3$ for 10 min so that a uniform thin layer of $SiO_2$ is formed on the surface, resulting in better adhesion of polystyrene spheres to the substrate.

The water dispersed polystyrene spheres were spin coated at 3000 rpm for 30 sec. A thin Fe layer (~100 nm) was deposited on the polystyrene coated Si substrate using RF sputtering. Eventually, the polystyrene spheres were ultrasonicately etched in trichloroethanol for 4 min. The iron template was used as the catalytic compound for the deposition of desired uniform diamond-like carbon nanorod film. The Si substrate was introduced in a HFCVD chamber employing two Rhenium filaments of 24 cm each so as to cover a large area of the substrate surface. Growth parameters were a gas mixture of 0.3% methane in hydrogen and 97.7% hydrogen sulphide in hydrogen, deposition pressure of 20 torr, substrate temperature of 900° C. and Filament temperature of about 4000° C.

II Results and Discussion

A) SEM and TEM

Figure 1:
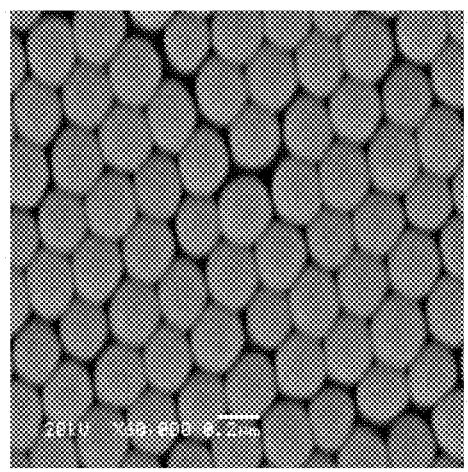
FIG. 1 shows SEM images of (a) PS spheres deposited on Si Substrate (b) Fe nanoisland (c) Uniform and random distribution of flappele and (d) magnified image of single flappele, according to the present invention.
Figure 1:
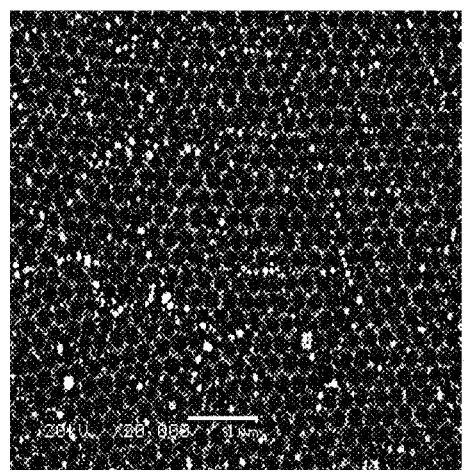
Figure 1:
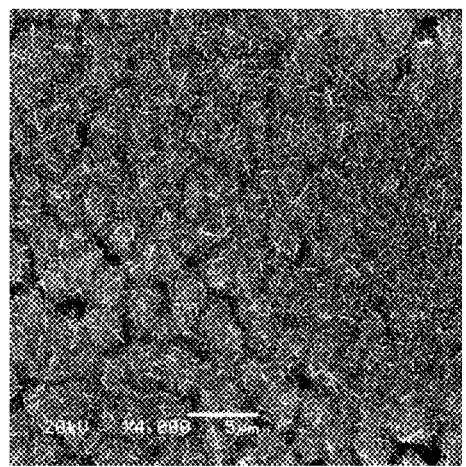
Figure 1:
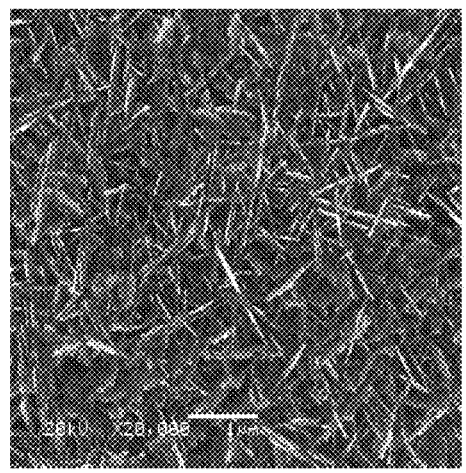

FIG. 1 shows the SEM micrograph of the polystyrene coated Si substrate and DLC nanorod film. A major problem encountered in the monolayer coverage of polystyrene spheres is the lack of areal uniformity throughout the wafer surface which in turn is due to non adhesion of polystyrene spheres on the substrate surface. To overcome this problem the Si substrates were ultrasonicated in HF and subsequently boiled in $HNO_3$ solution so that a uniform oxide layer is formed on the surface, resulting in good adhesion of polystyrene spheres.

FIG. 1a shows the Fe deposited polystyrene spheres and FIG. 1b shows the Fe nanoisland with a uniform distribution FIG. 1c shows the image of a non uniform distribution of papillae which is composed of nanorods that grow radial to the substrate and self assemble into micro- and nanoscale hierarchical structures. FIG. 1d displays the uniform distribution of nanorod film all over the substrate surface. Various papillae of diameters ranging from 0.2 to 0.4 μm are found arranged in a random pattern on the substrate surface.

A number of samples were prepared under the same conditions and an insight into their structural properties revealed that the constitution of the deposited film was consistent for all the samples but a slight inconsistency was observed in terms of uniformity of the film.

Figure 2:
FIG. 2 shows ERTEM images of DLC rods.
Figure 2:
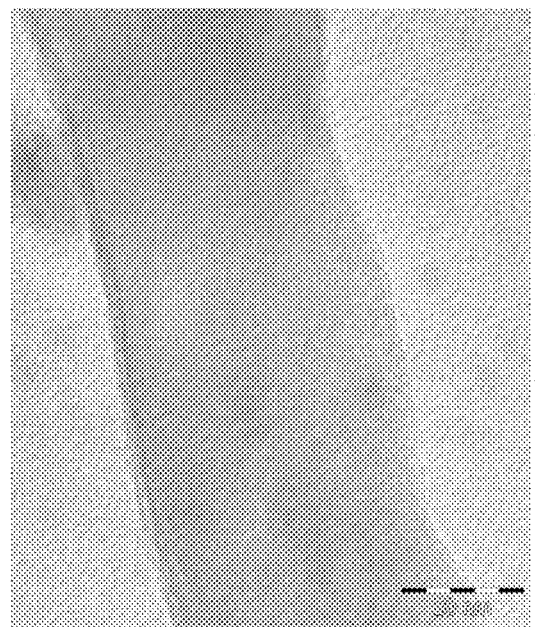

FIG. 2 represents the EFTEM of the deposited film. TEM samples were prepared by scratching the nanorod film from the substrate using a sharp tungsten tip and then deposited on a carbon TEM grid. The Figure distinctly shows the aggregation of Fe nanoparticles at the rod tip. The average diameter of the rods was estimated to be in the range of 35 nm-45 nm.

Figure 6:
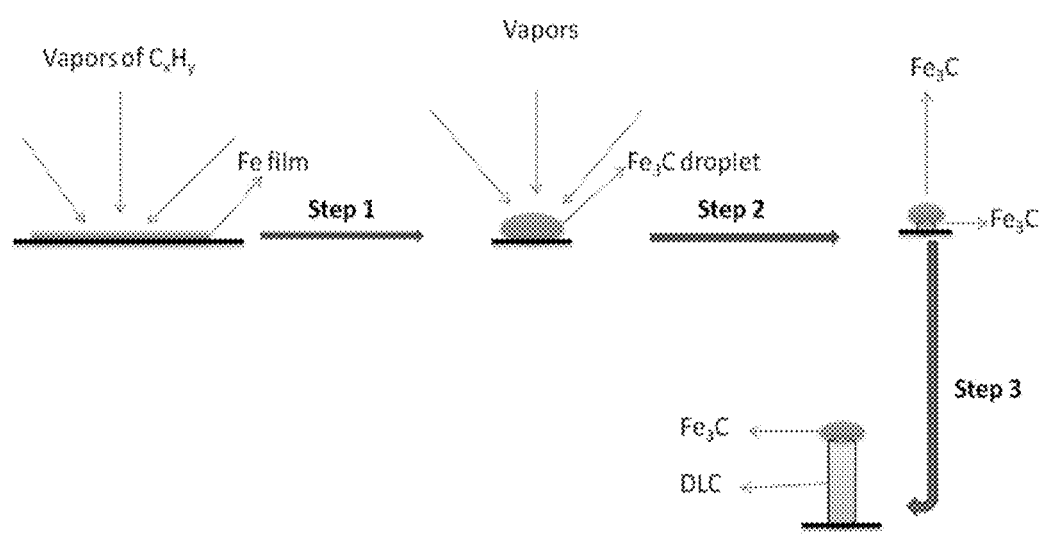
FIG. 6 illustrates a representation of the inventive mechanism, according to the present invention.

Based on the TEM studies, it is proposed that the growth of DLC nanorods is based on Physical vapor deposition process. As illustrated in FIG. 6, with an increase in temperature, the Fe on the substrate surface transforms into nanosized droplets and the active chemical species C, CH, $CH_2$ and $CH_3$ as well as $C_2$ and $C_2H$ interact with Fe surface producing $Fe_3C$. The incoming C, CH vapors from the filament diffuse and condense at the solid/liquid interface and rate of such process is dependent on concentration of the active chemical species C, CH, $CH_2$ and $CH_3$ as well as $C_2$ and $C_2H$, which are in the gas phase and are dependent on temperature. As the vapors are continuously absorbed by the Fe droplets the concentration of C increases leading to saturation and eventually initiating the nucleation of nanorods, thus, a mixture of $sp^2$ and $sp^3$ hybridized carbon (DLC) precipitates out at the solid-liquid interface and is pushed to form nanorods. This invention confirms the validity of the VLS growth mechanism at the nanometer scale.

The last step enthalpy is determined by C—C band energy and difference of interaction energy between C atom with substrate surface and $Fe_3C$ surface. If such difference is larger than 4.5 eV, the process of interest is exothermic, and we can expect that process of the DLC nanorods will have rate higher than process of growing of the carbon (diamond) thin layer as well as rate of the mentioned active chemical species interaction with DLC opened surface (cylinder surface) should be much less than discussed mechanism growing rate due to such processes are endothermic. So it is proposed the mechanism of the DLC growing by carbon substitution process in $Fe_3C$ compound (substitution diffusion of C in Fe layer). We may also assume that during of such growing process C atom in the forming material has tetrahedral configuration with many defects, because surface of substrate is not ideal plan, and the Fe layer has thickness distribution in the layer, that gives diffusing flax distribution by the layer surface.

III Micro Raman Analysis

Figure 3:
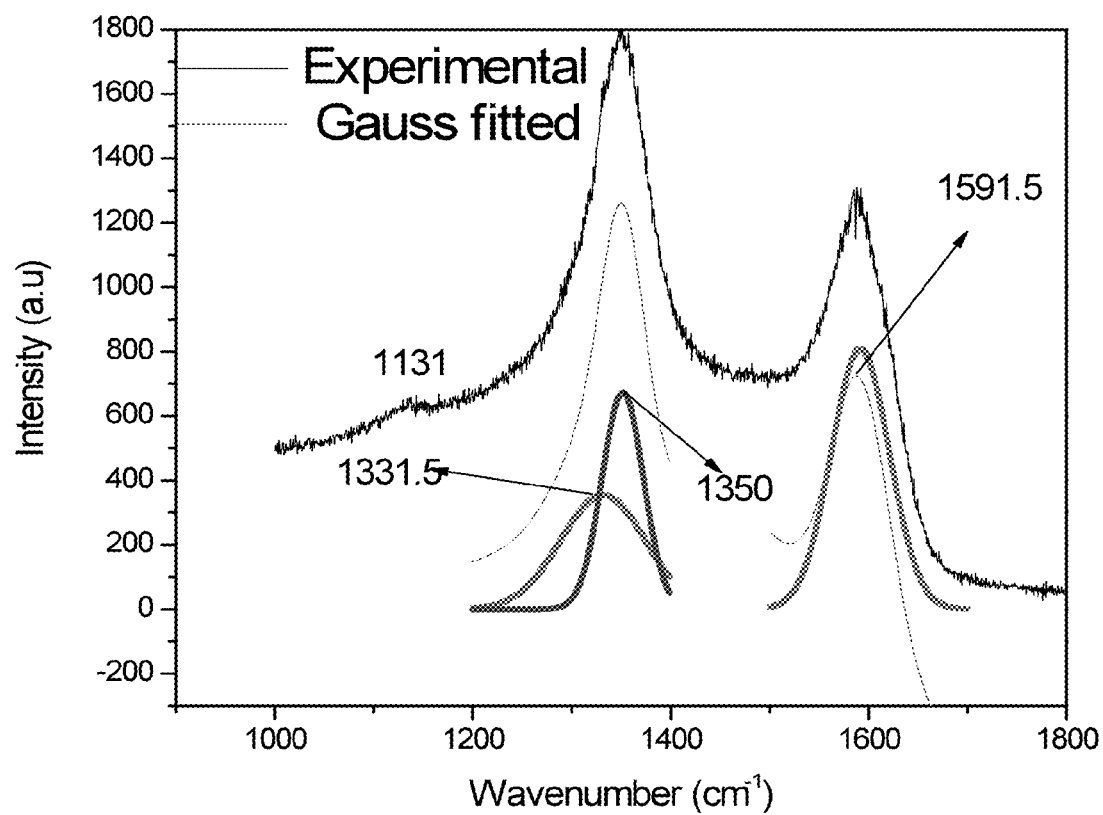
FIG. 3 shows Raman spectra of the DLC nanorod film, according to the present invention.
Figure 4:
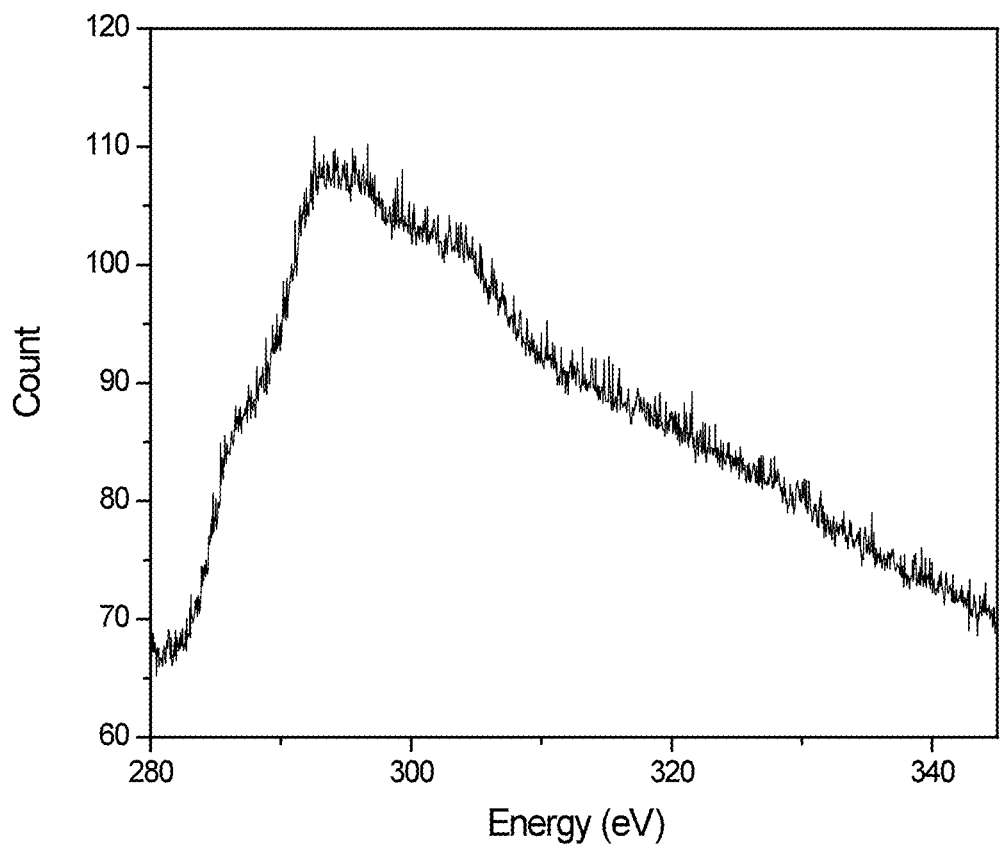
FIG. 4 shows EEL spectrum of the DLC nanorods film, according to the present invention.

Raman spectroscopy is largely used to study Carbon materials. The structural phases of the films were characterized by micro-Raman spectroscopy (RS). The deconvoluted visible Raman spectrum of the deposited sample shows four characteristic bands. As shown in FIG. 3, the peak around 1131 $cm^{-1}$ corresponds to the presence of diamond in nanocrystalline form. A broad peak at 1331.5 $cm^{-1}$ which is a typical signature of the presence of $sp^3$ bonded diamond phase. Graphitic carbon shows a G peak which is located at 1591 $cm^{-1}$ corresponding to $E_{2g}$ symmetry of graphite perfect crystal. The D-peak centered at 1350 $cm^{-1}$ corresponds to breathing mode $A_{1g}$ activated by disordered and forbidden in perfect graphite.

IV Electron Energy Loss Spectroscopy (EELS)

Figure 5:
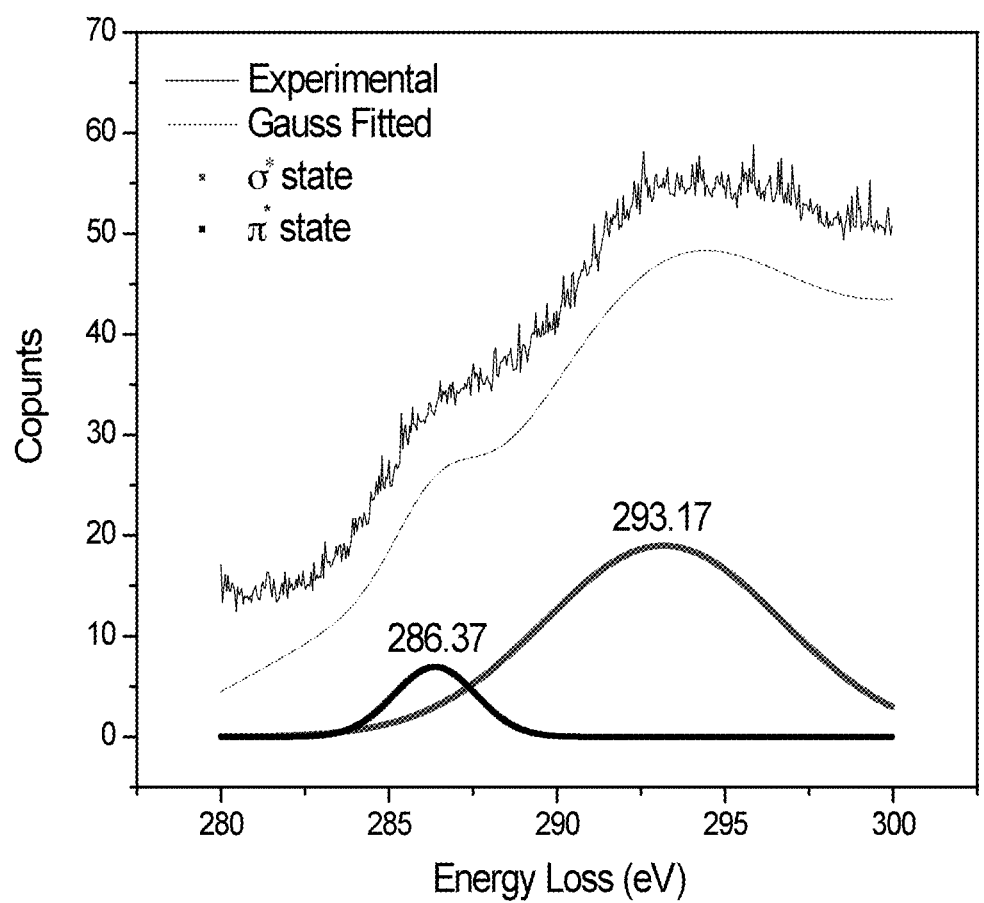
FIG. 5 shows a Gaussian fit of the EEL spectrum, according to the present invention.

Electron Energy-loss spectroscopy (EELS) study was carried out in the area shown in FIG. 2. FIG. 5 displays the carbon K-edge energy loss spectrum comprising two maxima at ~286 eV and at ~294 eV corresponding to 1s-$\pi^*$ ($sp^2$ C atom) and 1s-$\sigma^*$ ($sp^3$ C atom), respectively. The EELS spectrum of DLC nanorod film is dominated by plasmon exciton consisting of $\sigma^*$ Plasmon. The $sp^3$ fraction of the DLC film was estimated from the EELS spectrum. The C K-edge portion of the spectrum was deconvoluted to compare the intensities of $\pi^*$ and $\sigma^*$ features. The percentage of the $sp^3$ hybridized carbon was calculated from the ratio of the core $sp^3$ peak (~294 eV) area over the Carbon K-edge area in the range of from 280 eV to 300 eV.

CONCLUSION

A crystalline DLC nanorod film with a substantial amount of $sp^3$ bonded carbon atom has been synthesized by the CVD method using iron as catalyst. The most significant result of the present work is the growth of a DLC nanorod film. The film is characterized by special micro- and nano scale hierarchical surface structures having high purity which is evident from the D and G Raman peaks obtained at 1347.8 $cm^{-1}$ and 1590 $cm^{-1}$, respectively. The $sp^3$ carbon content was found to be around 88.80% as determined from Electron Energy Loss Spectroscopy.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. A method of fabricating diamond-like carbon nanorods comprising:
   exposing a catalyst-coated substrate to a mixture of gases comprising at least: a carbon-containing gas, hydrogen gas and a sulfur-containing gas species, in the presence of an energy source that breaks the gaseous molecules into radicals effectively fabricating diamond-like carbon nanorods on said catalyst-coated substrate, wherein the ratio of the carbon-containing gas and hydrogen is about 0.1-3.0:100.

2. The method of claim 1, wherein said catalyst-coated substrate is exposed to said mixtures of gases at a substrate temperature of from about 750° C. to about 1000° C.

3. The method of claim 1, wherein said catalyst-coated substrate is exposed to said mixtures of gases for a period of from about 30 min to about 90 min.

4. The method of claim 1, wherein said carbon-containing gas comprises at least one of: methane, acetylene, and alcohol.

5. The method of claim 4, wherein said alcohol is selected from C1-C6 alcohol.

6. The method of claim 1, wherein the substrate material comprises one of: Si, quartz, alumina and Cu.

7. The method of claim 1, wherein the catalyst is coated on the substrate by one of: chemical vapor deposition, physical vapor deposition, ion-beam deposition, sputtering, e-beam evaporation, vacuum deposition, spin coating, and dipping.

8. The method of claim 1, wherein the catalyst comprises iron.

9. The method of claim 1, wherein the catalyst comprises a layer of more than 0 nm and less than 100 nm.

10. The method of claim 1, wherein the sulphur-containing gas species comprises at least one of: hydrogen sulfide or carbon disulphide.

11. The method of claim 1, wherein the concentration of sulfur-containing gas species in the gas phase is in the range of from about 100 ppm to about 1000 ppm.

12. The method of claim 1, wherein the total pressure of the gases is in the range of from about 10 Torr to about 100 Torr.

13. The method of claim 1, wherein a nanorod of diamond-like carbon fabricated by said method has a longer axis in the range of from about 5 nm to about 500 nm and a shorter axis in the range of from about 0.5 nm to about 50 nm.

14. A method of fabricating diamond-like carbon nanorods comprising:
    forming a patterned nanotemplate coating of catalyst material on a substrate; and
    exposing said catalyst-coated substrate to a mixture of at least: a carbon-containing gas, hydrogen gas and a sulfur-containing gas species in the presence of an energy source that breaks the gaseous molecules into radicals effectively fabricating diamond-like carbon nanorods on said catalyst-coated substrate, wherein the ratio of the carbon-containing gas and hydrogen is about 0.1-3.0:100.

15. The method of claim 14, wherein said catalyst-coated substrate is exposed to said mixtures of gases at a substrate temperature of from about 750° C. to about 1000° C.

16. The method of claim 14, wherein said catalyst-coated substrate is exposed to said mixtures of gases for a period of from about 1 min to about 60 min in an evacuated chamber.

17. The method of claim 14 wherein, said patterned nanotemplate formation is made by one of: lithography, ion beam patterning, the use of nanostencils, photolithography, inkjet printing, and guided and unguided self assembly.

18. The method of claim 14, wherein the carbon-containing gas comprises at least one of: methane, acetylene, and alcohol.

19. The method of claim 18, wherein said alcohol is selected from C1-C6 alcohol.

20. The method of claim 14, wherein the substrate material comprises one of: Si, quartz, alumina and Cu.

21. The method of claim 14, wherein the catalyst is coated on the substrate by one of: chemical vapor deposition, physical vapor deposition, ion-beam deposition, sputtering, e-beam evaporation, vacuum deposition, spin coating, and dipping.

22. The method of claim 14, wherein said catalyst comprises iron.

23. The method of claim 14, wherein the catalyst comprises a layer of less than 100 nm.

24. The method of claim 14, wherein the sulphur-containing gas species comprises at least one of: hydrogen sulfide or carbon disulphide.

25. The method of claim 14, wherein the concentration of sulfur-containing gas species in the gas phase is in the range of from about 100 ppm to about 1000 ppm.

26. The method of claim 14, wherein the total pressure of the gases is in the range of from about 10 Torr to about 100 Torr.

* * * * *